United States Patent [19]

Jones et al.

[11] Patent Number: 5,125,998
[45] Date of Patent: Jun. 30, 1992

[54] PROCESS FOR IMPROVING THE BATH LIFE AND CURE TIME OF HEAT-CURABLE SILICONE COMPOSITIONS

[75] Inventors: John D. Jones; Leroy E. Thayer; Ming-Hsiung Yeh, all of Midland County, Mich.

[73] Assignee: Dow Corning Corporation, Midland, Mich.

[21] Appl. No.: 695,494

[22] Filed: May 2, 1991

Related U.S. Application Data

[63] Continuation-in-part of Ser. No. 431,352, Nov. 3, 1989, Pat. No. 5,036,117.

[51] Int. Cl.$^5$ .............................................. B32B 31/00
[52] U.S. Cl. ................................ 156/273.3; 427/54.1; 427/208.8; 427/387; 427/391
[58] Field of Search .................... 156/273.3; 427/54.1, 427/208.8, 387, 391

[56] References Cited

U.S. PATENT DOCUMENTS

| | | | |
|---|---|---|---|
| 4,256,870 | 3/1981 | Eckberg | 528/15 |
| 4,262,107 | 4/1981 | Eckberg | 528/15 |
| 4,340,710 | 7/1982 | Brown | 528/15 |
| 4,347,346 | 8/1982 | Eckberg | 528/15 |
| 4,472,563 | 9/1984 | Chardac et al. | 528/15 |
| 4,476,166 | 10/1984 | Eckberg | 427/387 |
| 4,562,096 | 12/1985 | Lu et al. | 427/208.8 |
| 4,774,111 | 9/1988 | Lo | 427/387 |

*Primary Examiner*—Michael Lusignan
*Attorney, Agent, or Firm*—Robert L. McKellar

[57] ABSTRACT

A process for improving the bath life and/or cure time of curable compositions. The process comprises first mixing an inhibitor with a catalyst, then adding that mixture to an organosilicon compound, and then adding the resulting mixture to an organohydrogensilicon compound. The process can optionally comprise a bath life extender compound. This process produces curable coating compositions which have a long bath life at room temperature and/or a rapid cure time at elevated temperatures such that they are useful in fast-paced coating operations, such as adhesive release coating operations wherein the cured coating is further coated with an adhesive immediately after being cured.

21 Claims, No Drawings

PROCESS FOR IMPROVING THE BATH LIFE AND CURE TIME OF HEAT-CURABLE SILICONE COMPOSITIONS

This is a continuation-in-part of copending application Ser. No. 07/431,352, filed Nov. 3, 1989, now U.S. Pat. No. 5,036,117.

BACKGROUND OF THE INVENTION

The present invention relates to an improved process which cures silicone compositions by way of a precious metal-catalyzed reaction of silicon-bonded radicals and results in an improved bath life. The present invention further relates to an improved process for increasing the bath life and/or cure time of heat curable silicone compositions.

Processes describing a platinum group metal-containing catalyst being inhibited in its cure-promoting activity at room temperature by the presence of a catalyst inhibitor are well known in the organosilicon art and need no detailed discussion herein.

The use of maleates and fumarates in inhibitor systems is well known in the art. There are several literature sources describing their preparation and uses.

The maleates have been found to be particularly effective for increasing the room temperature bath life, i.e. work time, of solventless coating organosilicon compositions which cure by way of a platinum group metal-catalyzed reaction. However, the heating time and/or temperature needed to cure in these maleate-inhibited systems is sometimes excessive. When one attempts to decrease the cure time and/or temperature of silicone compositions to a commercially desirable interval by using less maleate and/or more catalyst in these inhibitor systems the bath life is frequently decreased to a commercially undesirable interval.

The fumarate inhibitor systems have been found to allow a cure of a solventless coating organosilicon compositions which cure by way of a platinum group metal-catalyzed reaction to take place at a suitable heating time and/or temperature. However, the bath life of such a composition, as measured by gel time at room temperature, is not as long as desired. When one attempts to increase the bath life of these compositions by increasing the amount of fumarate and/or decreasing the amount of catalyst in the fumarate inhibitor systems the cure time and/or temperature increases.

This problem of increased cure time and/or cure temperature with increased bath life in an inhibited platinum group metal-catalyzed system is of particular significance for applications where the organosilicon composition is used to rapidly coat a substrate over a long period of time. In such a process a long bath life coupled with a short cure time, preferably at low-to-moderate temperature, is an essential property of the coating composition.

In the coating arts, such as the paper coating art, the coating composition that is used to coat a substrate should not cure to the extent that its viscosity has increased substantially before it has been applied to the substrate; however, it should rapidly cure thereafter, preferably with only a moderate amount of added energy. Typically this means that the coating compositions preferably should not gel for as long as eight hours but should cure rapidly at moderately increased temperature to such an extent that the coated substrate can be further processed, if desired, without damaging the coating. In addition, the cure time of the composition at a given cure temperature desirably should remain substantially constant as the bath ages.

In the preparation of laminates comprising a peelable release paper bearing a cured coating and an adhesive film releasably adhered thereto, such as a stick-on label, one of two processes is normally used. In one process, the off-line process, the silicone composition is coated on paper and cured; then, at a later time, an adhesive film is applied to the cured silicone coating. In the other process, the in-line process, the silicone composition is applied to paper and cured and the adhesive is then immediately coated on the cured silicone coating. While the in-line process is generally more efficient and would normally be more advantageous, it has been found that some adhesives bond, i.e. weld, to the silicone coated paper if the adhesive is applied to the silicone coated paper within a short time after the silicone composition has been cured. It is believed that residual reactivity in the cured silicone coating is responsible for the welding of the silicone and adhesive in the in-line process.

While the art has proposed and provided some solutions for the welding problem there is a need for further improvements in a release-coating process for in-line lamination of adhesives which cures at lower temperature and/or has a longer bath life.

There is also interest in applying silicone release coatings to substrates, such as polyethylene sheets, which are less stable at the elevated temperatures used to cure the silicone release coatings of the art. Consequently, there is a need for silicone coatings which cure at reduced temperatures. Of course, silicone coatings which have lower curing temperatures or faster curing rates are also desired for energy conservation and for more efficient production processes.

Several inhibitor systems have been used in the art to produce coating compositions which have a lower bath life and/or cure time. For example, U.S. Pat. No. 4,256,870 issued Mar. 17, 1981 to Eckberg teaches a method of producing a coating composition that has an improved bath life by mixing in any order a polysiloxane base polymer, a methylhydrogen crosslinking agent, a platinum catalyst, and diallylmaleate is added as an inhibitor to effectively retard the hydrosilation addition cure reaction of the composition at ambient temperature, but which does not retard the cure at elevated temperature.

Eckberg, U.S. Pat. No. 4,262,107 issued Apr. 14, 1981 teaches a one-part or two-part inhibitor system which produces a paper release coating composition with an improved bath life and cure time by mixing in any order a silanol polymer, a methylhydrogen crosslinking agent, a rhodium catalyst, and a low molecular weight silanol endstopped diorganopolysiloxane alone or in combination with a diallylmaleate as an inhibitor.

Lo et al., U.S. Pat. No. 4,562,096 issued Dec. 31, 1985 teaches a one-part inhibitor system that produces a release coating with an improved cure time by mixing in any order a vinyl functional polysiloxane base polymer, an organohydrogenpolysiloxane crosslinker, a platinum catalyst, and a hydrocarbonoxyalkyl maleate as an inhibitor.

Eckberg, U.S. Pat. No. 4,476,166 issued Oct. 9, 1984 teaches a two-part inhibitor system that produces a solventless silicone release coating with improved bath life and cure time by mixing in any order an olefinorganopolysiloxane, an organohydrogenpolysiloxane as a crosslinking agent, a platinum catalyst, and a blend of diallylmaleate and vinyl acetate as an inhibitor.

Fumarate inhibitor systems have also been described in the art. For example Lo, U.S. Pat. No. 4,774,111 teaches a process for improving the bath life and cure time of heat-curable silicone compositions by mixing in any order an organosiloxane base polymer, an organohydrogenpolysiloxane crosslinker, a platinum catalyst, and a diorgano fumarate cure control additive as an inhibitor. The most recent inhibitor system that has been described in the art is in U.S. application for patent, Ser. No. 431,352, filing date Nov. 3, 1989, and assigned to the same assignee as this present application, which teaches a process for producing a curable organosilicon composition comprising mixing, in any order, a component having silicon- bonded hydrogen atoms, a component having silicon bonded radicals reactive therewith, a curing catalyst, a catalyst- inhibitor, and a bath life extender. In other words the patentees of the above filed application teach a five component system with no critical order of mixing these components. In contrast, the present invention teaches a four component system with an optional bath life extender component that, with a specific order of mixing, unexpectedly produces a composition that has a longer bath life and/or shorter cure time than the comparable processes described in the art.

The inhibitor systems taught by the existing art do not describe a process which greatly reduces the cure time and/or significantly increases the bath life of heat-curable silicone compositions by utilizing a specific order of mixing the components to achieve the above unexpected results.

SUMMARY OF THE INVENTION

It is an object of this invention to provide a process to produce improved curable organosilicon compositions. It is also an object of this invention to provide a process for producing organopolysiloxane compositions which do not cure at room temperature for long periods of time but which cure rapidly when heated to moderately elevated temperatures and/or irradiated with actinic radiation. It is an additional object of this invention to provide an improved process for preparing curable coating compositions and a process for preparing adhesive release liners. It is a further object of this invention to provide a way to control the cure of a platinum group metal-catalyzed organopolysiloxane composition so as to provide for the composition a short cure time at moderately elevated temperatures which does not drift, i.e., change, as the curable composition ages at room temperature. These objects, and others which will occur to one of ordinary skill in the curable organosilicon composition art upon considering the following disclosure and appended claims, are obtained by the present invention which, briefly stated, comprises the process producing a curable organosilicon composition comprising first mixing a platinum group metal-containing catalyst and a cure-control component comprising an inhibitor component, then adding this mixture to a component having silicon-bonded hydroxyl and/or olefinic hydrocarbon radicals, finally adding to the resulting mixture a component having silicon-bonded hydrogen atoms, said components hereinafter being delineated. In another object of this invention, the inhibitor component is used in a process in an amount which is insufficient, by itself, to provide adequate bath life for the composition; however, in the presence of the bath life extender component an adequate bath life is obtained.

According to the present invention it has been surprisingly discovered that the use of certain order of mixing the above described components effectively extends the room temperature bath life of a platinum group metal- catalyzed silicone coating composition containing a catalyst inhibitor. In another object of this invention, by being a substantial non-inhibitor for the metal-containing catalyst, the bath life extender component does not affect the curing behavior of the composition at elevated temperatures. Thus, in combination, the inhibitor component and the bath life extender component regulates the heat-curing of the composition and its room temperature stability.

This discovery has permitted the preparation of curable coating compositions which not only have improved bath life but, unexpectedly, have the stable cure profile of the hydrocarbonoxyalkyl maleate-inhibited compositions of U.S. Pat. No. 4,562,096. That is to say, the compositions produced by the process of the present invention possess long bath lives at room temperature and a rapid cure time at elevated temperatures which does not drift, i.e. change to a different cure time, as the coating compositions ages over a typical production run.

The room temperature cure times of the coating compositions produced by the process of this invention are adequately long and their cure times at elevated temperature are advantageously brief, that they are useful in fast-paced coating operations, such as adhesive release coating operations wherein the cured coating is further coated with an adhesive in-line, i.e., immediately after being cured.

While not limiting the present invention with any particular theory, we believe that by premixing the catalyst and inhibitor before adding any other components to the system allows the formation of a catalyst/inhibitor complex which results in the composition produced by such a process having a longer bath life. Also when a bath life extender component is added as an optional component in this invention it provides its benefits by becoming loosely associated with and forming a protective layer around the catalyst/inhibitor complex. One theory for this protective action proposes a micelle-type construction wherein the catalyst/inhibitor complex is surrounded by a layer of bath life extender molecules in a manner which results in a more complete blocking of available coordination sites on the catalyst/inhibitor complex at room temperature, thereby delaying a reaction of silicon-bonded hydrogen atoms with silicon-bonded hydroxy or olefinic hydrocarbon radicals and/or, when reaction does take place, delaying the departure of reaction products from the catalyst/inhibitor complex. In fact, the most effective materials to be used as the bath life extender component in the compositions of this invention are non-inhibitors for a platinum group metal-containing catalyst, especially the below-noted preferred complex of chloroplatinic acid and a vinylsiloxane. At elevated temperatures the loosely associated bath life extender molecules are thought to be easily disassociated from the catalyst/inhibitor complex.

DETAILED DESCRIPTION OF THE INVENTION

The present invention relates to a process for improving one or more properties selected from the group consisting of the bath life and cure time of curable compositions, the process comprising the steps of: (I) first mixing (A) an inhibitor compound and (B) a platinum group metal-containing catalyst, (II) thereafter adding the mixture of (I) to (C) an organosilicon compound having an average of at least two curing radicals per molecule thereof selected from the group consisting of the hydroxy radical and olefinic hydrocarbon radicals, and (III) thereafter, adding to the mixture of (II), (D) an organohydrogensilicon compound containing an average of at least two silicon-bonded hydrogen atoms per molecule thereof, the amounts of Components (C) and (D) being sufficient to provide a ratio of the number of silicon-bonded hydrogen atoms to the number of silicon-bonded curing radicals of from 1/100 to 100/1, (IV) applying the mixture from (III) to a solid substrate to form a coating, then (V) exposing the coating to an energy source selected from the group consisting of heat and actinic radiation in an amount sufficient to cure said coating whereby the amount of Component (A) present in the total composition of Components (A), (B), (C), and (D), is sufficient to retard any curing reaction at room temperature but insufficient to prevent any reaction at elevated temperatures and whereby the amount of Component (B) is sufficient to accelerate any curing reaction among the silicon-bonded curing radicals and the silicon-bonded hydrogen atoms at elevated temperatures. Herein the term "curable", as applied to compositions of this invention, generally denotes a chemical change which leads to a change in the state of the composition from a liquid to a solid. For the coating compositions produced by the process of this invention which are used as adhesive- release coatings the term "curable" has a more detailed meaning which encompasses the absence of smear, migration, and rub-off of the coating, as delineated below.

The curing of the compositions in the process of this invention is accomplished by a reaction between silicon-bonded hydroxy and/or olefinic hydrocarbon radicals in Component (C) and the silicon-bonded hydrogen atoms in Component (D). The curing of the compositions in the process of this invention is controlled by the platinum group metal-containing catalyst Component (B), and the inhibitor Component (A). These components are delineated as follows.

Component (A) of the process of this invention is any material that is known to be, or can be, used as an inhibitor for the catalytic activity of platinum group metal-containing catalysts. By the term "inhibitor" it is meant herein a material that retards the room temperature curing of a curable mixture of Components (B), (C), and (D), when incorporated therein in small amounts, such as less than 10 percent by weight of the composition, without preventing the elevated temperature of the mixture. Materials such as saturated hydrocarbons are not considered inhibitors for the purposes of this invention.

Inhibitors for the platinum group metal catalysts are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Pat. Nos. 3,445,420 and 4,347,346; ethylenically unsaturated isocyanates, U.S. Pat. No. 3,882,083; olefinic siloxanes, U.S. Pat. No. 3,989,667; unsaturated hydrocarbon diesters, U.S. Pat. Nos. 4,256,870; 4,476,166 and 4,562,096, and conjugated ene-ynes, U.S. Pat. Nos. 4,465,818 and 4,472,563; other organic compounds such as hydroperoxides, U.S. Pat. No. 4,061,609; ketones, U.S. Pat. No. 3,418,731; sulfoxides, amines, phosphines, phosphites, nitriles, U.S. Pat. No. 3,344,111; diaziridines, U.S. Pat. No. 4,043,977; and various salts, such as U.S. Pat. No. 3,461,185. It is believed that the process of this invention can comprise an inhibitor from any of these classes of inhibitors.

Organic inhibitor compounds which bear aliphatic unsaturation and one or more polar groups, such as carbonyl or alcohol groups, display useful bath life extension benefits. Examples thereof include the acetylenic alcohols of Kookootsedes and Plueddemann, U.S. Pat. No. 3,445,420, such as ethynylcyclohexanol and methylbutynol; the unsaturated carboxylic esters of Eckberg, U.S. Pat. No. 4,256,870, such as diallyl maleate and dimethyl maleate; and the maleates and fumarates of Lo, U.S. Pat. Nos. 4,562,096 and 4,774,111, such as diethyl fumarate, diallyl fumarate, and bis-(methoxyisopropyl) maleate. The half esters and amides of Melanchon, U.S. Pat. No. 4,533,575; and the inhibitor mixtures of Eckberg, U.S. Pat. No. 4,476,166 would also be expected to behave similarly. The above-mentioned patents relating to inhibitors for platinum group metal-containing catalysts are incorporated herein by reference to teach how to prepare compounds which are suitable for use as Component (A) in the process of this invention. Maleates and fumarates are the preferred inhibitors for the process of this invention.

The maleates and fumarates that are preferred as Component (A) in the process of this invention have the formula $R^1(OQ)_tO_2CCH=CHCO_2(QO)_tR^1$ wherein $R^1$ denotes an hydrocarbon radical having from 1 to 10 carbon atoms and each Q denotes, independently, an alkylene radical having from 2 to 4 carbon atoms. $R^1$ can be, for example, an alkyl radical such as methyl, ethyl, propyl, isopropyl, butyl, pentyl, or hexyl; an aryl radical such as phenyl or benzyl; an alkenyl radical such as vinyl or allyl; alkynyl radicals; or a cyclohydrocarbon radical such as cyclohexyl. Q can be for example, $-CH_2CH_2-$, $-CH_2(CH_3)CH-$, $-CH_2CH_2CH_2-$, $-CH_2CH_2CH_2CH_2-$, $-CH_2(CH_3CH_2)CH-$ and $-CH_2CH_2(CH_3)CH-$. The individual $R^1$ radicals and Q radicals of the maleates and fumarates can be identical or different, as desired. The value of subscript t in the formula immediately above can a value equal to zero or 1. The individual values of t can be identical or different, as desired. For the process of this invention, when the linear polydiorganosiloxane Component (C) containing olefinic hydrocarbon radicals, the maleates and/or fumurates, when combined with Component (D), provide a superior curing action. Bis(2-methoxyisopropyl) maleate and diethyl fumarate are preferred.

The amount of Component (A) to be used in the process of this invention is not critical and can be any amount that will retard the above described catalyzed reaction at room temperature while not preventing said reaction at elevated temperature. No specific amount of inhibitor can be suggested to obtain a specified bath life at room temperature since the desired amount of any particular inhibitor to be used will depend upon the concentration and type of the platinum group metal containing catalyst, the nature and amounts of Components (C) and (D) and the presence or absence of optional ingredients. In the liquid organopolysiloxane compositions that are used in the process of this invention the amount of inhibitor is typically sufficient to provide from 25 to 50 molecules thereof for every platinum group metal atom in the composition. Maleates and fumarates added in small amounts, such as 0.1 weight percent based on the weight of Component (C), in the process of this invention provide an increased bath life. A practical upper limit appears to be 0.2 percent for a maleate inhibitor and 2.0 percent for a fumarate inhibitor, if a cure time at 82° C. of less than 30 seconds is desired. Greater amounts of maleates and fumarates can be used if desired; however, drifting or long cure times may result. We have generally taught the broad and narrow limits for the inhibitor component concentration for the process of this invention, however, one skilled in the art can readily determine the optimum level for each application as desired.

Component (B) of the process of this invention can be any platinum group metal-containing catalyst component which facilitates the reaction of the silicon-bonded hydrogen atoms of Component (D) with the silicon-bonded hydroxy and/or silicon-bonded olefinic hydrocarbon radicals of Component (C). By platinum group it is meant herein ruthenium, rhodium, palladium, osmium, iridium and platinum.

Component (B) is preferably a platinum containing catalyst component since they are the most widely used and available and because they provide a more favorable effect for the process of this invention in terms of improved pot life and/or cure time. Platinum-containing catalysts can be platinum metal, optionally deposited on a carrier, such as silica gel or powdered charcoal; or a compound or complex of a platinum group metal. A preferred platinum-containing catalyst component in the process of this invention is a form of chloroplatinic acid, either as the commonly available hexahydrate form or as the anhydrous form, as taught by Speier, U.S. Pat. No. 2,823,218, incorporated herein by reference. A particularly useful form of chloroplatinic acid is that composition obtained when it is reacted with an aliphatically unsaturated organosilicon compound such as divinyltetramethyldisiloxane, as disclosed by Willing, U.S. Pat. No. 3,419,593, incorporated herein by reference, because of its easy dispersibility in organosilicon systems. Other platinum catalysts which are thought to be useful in the present invention include those disclosed in U.S. Pat. Nos. 3,159,601; 3,159,602; 3,220,972; 3,296,291; 3,516,946; 3,814,730 and 3,928,629, incorporated herein by reference. The amount of platinum group metal-containing catalyst component that is used in the process of this invention is notnarrowly limited as long as there is a sufficient amount toaccelerate a room temperature reaction between the silicon-bonded hydrogen atoms of Component (D) with the silicon-bonded hydroxy and/or olefinic hydrocarbon radicals of Component (C) and not so much as to make its action uncontrollable by the use of Component (A). The exact necessary amount of this catalyst component will depend on the particular catalyst utilized and is not easily predictable. However, for platinum containing catalysts the amount can be as low as one part by weight of platinum for every one million parts by weight of organosilicon Component (C). Preferably the amount is at least 10 parts by weight, on the same basis. Component (C) of the process of this invention can be anyorganosilicon compound containing at least one silicon atomand from 1 to 4 silicon-bonded monovalent radicals per silicon; with the proviso that the organosilicon compound contains at least two silicon-bonded curing radicals selected from the hydroxy radical and olefinic hydrocarbon radicals. This component can be a solid or a liquid having any viscosity, such as a freely flowing, gum-like material or a hydrocarbon-soluble resin.

Multiple silicon atoms in Component (C) are linked by divalent radicals which include oxygen atoms, which provide siloxane bonds and aliphatically saturated hydrocarbon, hydrocarbon ether, halohydrocarbon ether and halohydrocarbon radicals which provide silcarbane bonds. The divalent radicals in Component (C) can be the same or different, as desired. Preferred divalent hydrocarbon radicals are 1-20 carbon atom alkylene radicals.

The monovalent radicals in Component (C) can contain up to 20 carbon atoms and include halohydrocarbon radicals free of aliphatic unsaturation, hydrocarbon radicals and hydroxy radicals.

Component (C) of the compositions of this invention is typically an organopolysiloxane having the average unit formula $R_c^2SiO_{(4-c)/2}$ wherein $R^2$ denotes said monovalent radical, delineated and limited above and the subscript c has a value of from 1 to 3, such as 1.0, 1.2, 1.9, 2.0, 2.1, 2.4 and 3.0. The organopolysiloxanes having the above average unit formula contain siloxane units having the formulae $R_3^2SiO_{1/2}$, $R_2^2SiO_{2/2}$, $R^2SiO_{3/2}$ and $SiO_{4/2}$. Said siloxane units can be combined in any molecular arrangement such as linear, branched, cyclic and combinations thereof, to provide organopolysiloxanes that are useful as Component (C).

Component (C) of the process of this invention is preferably an organosilicon compound having the formula $XR_2SiO(RXSiO)_rSiR_2X$. This being a substantially linear organopolysiloxane compound. By the term "substantially linear" it is meant that the component contains no more than trace amounts of silicon atoms bearing 3 or 4 siloxane linkages or silicon atoms bearing more than 1 hydroxy radical but up to about 15 percent by weight cyclopolydiorganosiloxanes which are frequently co-produced with the linear organopolysiloxanes.

In the formula shown immediately above each R denotes a monovalent hydrocarbon or halohydrocarbon radical free of aliphatic unsaturation and having from 1 to 20 carbon atoms. Monovalent hydrocarbon radicals include alkyl radicals, such as methyl, ethyl, propyl, butyl, hexyl, and octyl; cycloaliphatic radicals, such as cyclohexyl; aryl radicals, such as phenyl, tolyl, and xylyl; aralkyl radicals, such as benzyl and phenylethyl; and olefinic hydrocarbon radicals, such as vinyl, allyl, methallyl, butenyl, and hexenyl, octenyl, cyclohexenyl and styryl. Alkenyl radicals are preferably terminally unsaturated. Of the higher alkenyl radicals those selected from the group consisting of 5-hexenyl, 7-octenyl, and 9-decenyl are preferred because of the more ready availability of the alpha, omega-dienes that can be used to prepare the alkenylsiloxanes. Highly preferred monovalent hydrocarbon radical for the silicon-containing components of this invention are methyl, phenyl, vinyl, and 5-hexenyl. Monovalent halohydrocarbon radicals free of aliphatic unsaturation include any monovalent hydrocarbon radical noted above which is free of aliphatic unsaturation and has at least one of its hydrogen atoms replaced with a halogen, such as fluorine, chlorine, or bromine. Preferred monovalent halohydrocarbon radicals have the formula $C_nF_{2n+1}CH_2CH_2-$ wherein the subscript n has a value of from 1 to 10, such as, for example, $CF_3CH_2CH_2-$ and $C_4F_9CH_2CH_2-$. The several R radicals can be identical or different, as desired. Independently, each X denotes hydroxy, R, or an olefinic hydrocarbon radical having from 2 to 20 carbon atoms as exemplified above. Of course, at least two X radicals are hydroxy or olefinic hydrocarbon radicals. For the process of this invention X is preferably an olefinic hydrocarbon radical and at least 50 percent of all R radicals are methyl. The value of the subscript r in the above formula is such that the linear organopolysiloxane (C) has a viscosity at 25° C. of at least 25 millipascal-seconds (25 centipoise). The exact value of r that is needed to provide a viscosity value meeting said limit depends upon the identity of the X and R radicals; however, for hydrocarbyl-terminated polydimethylsiloxane r will have a value of at least 25. Examples of linear organopolysiloxanes of the above formula for Component (C) which are suitable compounds for Component (C) for the process of this invention include HO{Me(CF$_3$CH$_2$CH$_2$)SiO}$_r$H, HO(Me$_2$SiO)$_r$H, HO{(Me$_2$SiO)$_{0.9}$(MeViSiO)$_{0.1}$}$_r$H, ViMe$_2$SiO(Me$_2$SiO)$_r$SiMe$_2$Vi, HexMe$_2$SiO(Me$_2$SiO)$_r$SiMe$_2$Hex, HexMe$_2$SiO(Me$_2$SiO)$_{0.95r}$(MeHexSiO)$_{0.05r}$SiMe$_2$Hex, Me$_3$SiO(Me$_2$SiO)$_{0.9r}$(MeViSiO)$_{0.1r}$SiMe$_3$, ViMe$_2$SiO(Me$_2$SiO)$_{0.95r}$(MeViSiO)$_{0.05r}$SiMe$_2$Vi, Me$_3$SiO(Me$_2$SiO)$_{0.9r}$(MeHexSiO)$_{0.1r}$SiMe$_3$ and PhMeViSiO(Me$_2$SiO)$_{0.93r}$(MePhSiO)$_{0.07r}$SiPhMeVi wherein Me, Vi, Hex, and Ph denote methyl, vinyl, 5-hexenyl and phenyl, respectively.

For the coating composition produced by the process of this invention, it is highly preferred that the linear organopolysiloxanes (C) have the formula XMe$_2$SiO(Me$_2$SiO)$_b$(MeXSiO)$_d$SiMe$_2$X wherein X is as noted above and the sum of the subscripts b plus d is equal to x, also noted above. The values of the subscripts b and d can each be zero or greater; however, the value of d is typically less than 10% of the value of b.

In a preferred embodiment of the present invention, wherein the curable composition is used to coat a solid substrate, such as paper, with an adhesive-releasing coating, the value of b plus d in the highly preferred organopolysiloxane (C) is sufficient to provide a viscosity at 25C for the Component (C) of at least 100 mPa.s, such as from about 100 mPa.s to about 100 Pa.s, preferably from about 100 mPa.s to 10 Pa.s and, most preferably, from 100 mPa.s to 5 Pa.s; said viscosities corresponding approximately to values of b+d of at least 60, such as from 60 to 1000, preferably 60 to 520 and, most preferably, 60 to 420, respectively. In addition, the value of subscript d is preferably limited to less than 0.1 b as noted above.

Component (D) of the process of this invention can be any organohydrogensilicon compound which is free of aliphatic unsaturation and contains two or more silicon atoms linked by divalent radicals, an average of from one to two silicon-bonded monovalent radicals per silicon atom and an average of at least two, and preferably three or more silicon-bonded hydrogen atoms per molecule thereof. Preferably Component (D) contains an average of three or more silicon-bonded hydrogen atoms such as, for example, 5, 10, 20, 40 and more.

Divalent radicals linking silicon atoms in Component (D) are as delineated above for Component (C), including preferred examples. As with Component (C), the divalent radicals within Component (D) can be identical or different, as desired. Furthermore, the divalent radicals that are present in Component (D) can, but need not, be the same as the divalent radicals that are present in Component (C).

Monovalent radicals in Component (D) include monovalent hydrocarbon and halohydrocarbon radicals free of aliphatic unsaturation, as delineated above for Component (C), including preferred examples. The monovalent radicals that are present in Component (D) are preferably, but need not be, the same as the monovalent radicals that are present in Component (C).

Component (D) of the compositions of this invention is an organohydrogenpolysiloxane having the average unit formula $R_e^3H_fSiO_{(4-e-f)/2}$ wherein $R^3$ denotes said monovalent radical free of aliphatic unsaturation, the subscript f has a value of from greater than 0 to 1, such as 0.001, 0.01, 0.1 and 1.0, and the sum of the subscripts e plus f has a value of from 1 to 3, such as 1.2, 1.9 and 2.5. Siloxane units in the organohydrogenpolysiloxanes having the average unit formula immediately above have the formulae $R_3^3SiO_{\frac{1}{2}}$, $R_2^3HSiO_{\frac{1}{2}}$, $R_2^3SiO_{2/2}$, $R^3HSiO_{2/2}$, $R^3SiO_{3/2}$, $HSiO_{3/2}$ and $SiO_{4/2}$. Said siloxane units can be combined in any molecular arrangement such as linear, branched, cyclic and combinations thereof, to provide organohydrogenpolysiloxanes that are useful as Component (D).

A preferred organohydrogenpolysiloxane Component (D) for the compositions of this invention is a substantially linear organohydrogenpolysiloxane having the formula YR$_2$SiO(YRSiO)$_y$SiR$_2$Y wherein each R denotes a monovalent hydrocarbon or halohydrocarbon radical free of aliphatic unsaturation and having from 1 to 20 carbon atoms, as exemplified above. The several R radicals can be identical or different, as desired. Additionally, each Y denotes a hydrogen atom or an R radical. Of course, at least two Y radicals must be hydrogen atoms. The value of the subscript y is not critical; however, for the process of this invention, it is preferably such that the organohydrogenpolysiloxane Component (D) has a viscosity at 25° C. of up to 100 millipascal-seconds. The exact value of y needed to provide a viscosity value falling within said limits depends upon the number and identity of the R radicals; however, for organohydrogenpolysiloxanes containing only methyl radicals as R radicals y will have a value of from about 0 to about 100.

In terms of preferred monovalent hydrocarbon radicals, noted above, examples of organopolysiloxanes of the above formulae which are suitable as Component (D) for the compositions of this invention include HMe$_2$SiO(Me$_2$SiO)$_y$SiMe$_2$H, (HMe$_2$SiO)$_4$Si, cyclo-(MeHSiO)$_y$, (CF$_3$CH$_2$CH$_2$)MeHSiO{Me(CF$_3$CH$_2$CH$_2$)SiO}$_y$SiHMe(CH$_2$CH$_2$CF$_3$), Me$_3$SiO(MeHSiO)$_y$SiMe$_3$, HMe$_2$SiO(Me$_2$SiO)$_{0.5y}$(MeHSiO)$_{0.5y}$SiMe$_2$H, HMe$_2$SiO(Me$_2$SiO)$_{0.5y}$(MePhSiO)$_{0.1y}$(MeHSiO)$_{0.4y}$SiMe$_2$H, Me$_3$SiO(Me$_2$SiO)$_{0.3y}$(MeHSiO)$_{0.7y}$SiMe$_3$ and MeSi(OSiMe$_2$H)$_3$ organohydrogenpolysiloxanes that are useful as Component (D).

Highly preferred linear organohydrogenpolysiloxane (D) for the coating compositions of this invention have the formula YMe$_2$SiO(Me$_2$SiO)$_p$(MeYSiO)$_q$SiMe$_2$Y wherein Y denotes a hydrogen atom or a methyl radical. As noted above, an average of at least two Y radicals per molecule of Component (D) must be hydrogen atoms. The subscripts p and q can have average values of zero or more and the sum of p plus q has a value equal to y, noted above. The disclosure of U.S. Pat. No. 4,154,714 shows highly-preferred organohydrogenpolysiloxanes.

The amounts of Components (C) and (D) that are used in the compositions of this invention are not narrowly limited. Said amounts, expressed in terms of the ratio of the number of silicon-bonded hydrogen atoms of Component (D) to the number of silicon-bonded hydroxy and/or olefinic hydrocarbon radicals of Component (C), are sufficient to provide a value of from 1/100 to 100/1 for said ratio, usually from ½ to 20/1 and, preferably, from ½ to 2/1. For the liquid coating compositions of this invention which are to be used in the coating method of this invention, hereinbelow delineated, the value of said ratio should have a value of from ½ to 2/1 and, preferably, about 1/1.

Organosilicon polymers are, of course, well known in the organosilicon art. Their preparation is well documented and needs no intensive delineation herein. Organopolysiloxanes are clearly the most significant and most widely used form of organosilicon polymers in the art and in this invention; many are commercially prepared.

Briefly, organopolysiloxanes are typically prepared by way of hydrolysis and condensation of hydrolyzable silanes such as $Me_2SiCl_2$, $Me_3SiCl$, $MeSiCl_3$, $SiCl_4$, $Me_2Si(OMe)_2$, $MeSi(OMe)_3$ and $Si(OCH_2CH_3)_4$ or by way of acid- or alkali-catalyzed siloxane equilibration of suitable siloxane precursors such as cyclo-$(Me_2SiO)_4$ and $Me_3SiOSiMe_3$, which themselves are prepared by way of said hydrolysis and condensation reactions.

Organosilicon polymers having both silcarbane and siloxane structure can be prepared, for example, from monomeric species that have non-oxygen divalent radicals, such as $O_{\frac{1}{2}}Me_2SiCH_2CH_2Me_2SiO_{\frac{1}{2}}$ or $ClMe_2SiC_6H_4SiMe_2Cl$, using standard hydrolysis and condensation reactions, noted above, and incorporating one or more of the olefinic hydrocarbon radicals or hydrogen atom-containing silanes or siloxanes noted above and other silanes or siloxanes, as desired. Organosilicon polymers which contain no siloxane bonds can be prepared, for example, by a hydrosilylation reaction between silanes or silcarbanes bearing silicon-bonded olefinically unsaturated hydrocarbon radicals, such as $Vi_2SiMe_2$ or $ViMe_2SiC_6H_4SiMe_2Vi$ and silanes or silcarbanes bearing silicon-bonded hydrogen atoms, such as $H_2SiMe_2$ or $HMe_2SiC_6H_4SiMe_2H$.

Other suitable methods for preparing the organosilicon components that are used in the compositions of this invention also occur in the organosilicon art.

Organopolysiloxane Component (C) containing olefinic hydrocarbon radicals can be prepared as noted above with the proviso that a silane or siloxane containing at least one silicon-bonded olefinic hydrocarbon radical is used, alone or in conjunction with other silanes or siloxanes, in sufficient amount to provide the necessary number of olefinic hydrocarbon radicals in the organopolysiloxane. Examples of olefinic hydrocarbon radical-containing silanes or siloxanes include, but are not limited to, $ViMe_2SiCl$, $HexMe_2SiCl$, $MeViSiCl_2$, $MeHexSiCl_2$, $ViSiCl_3$, $HexSiCl_3$, $(MeViSiO)_4$, $HexMe_2SiOSiMe_2Hex$ and $ViMe_2SiOSiMe_2Vi$.

It is usually preferred to prepare olefinic siloxanes by hydrolyzing a readily hydrolyzable silane, such as 5-hexenyl- or vinyl-methyldichlorosilane, in excess water and then equilibrating the resulting hydrolyzate with cyclopolydimethylsiloxanes and a siloxane oligomer containing triorganosiloxane end groups, using a base catalyst such as KOH. However, it is believed that olefinic polydiorganosiloxanes may also be advantageously prepared in a one-step acid-catalyzed process wherein the hydrolyzable silane is hydrolyzed and simultaneously equilibrated with cyclopolydimethylsiloxanes and siloxane oligomer containing end groups.

Alternatively, known polyorganohydrogensiloxanes bearing reactive SiH groups can be reacted with an alpha, omega-diene, such as 1,5-hexadiene, to prepare higher alkenyl-substituted organopolysiloxanes. It should be noted that linear siloxanes produced by equilibration procedures may contain small amounts, such as 0 to 15 weight percent, of cyclopolydiorganosiloxanes which may be volatile at temperatures up to 150° C. For the purposes of this invention either siloxanes that still contain the small amounts of cyclics or siloxanes from which the co-produced cyclics have been removed by volatilization may be used.

Organohydrogenpolysiloxane Component (D) can be prepared as noted above with the proviso that a silane or siloxane containing at least one silicon-bonded hydrogen atom, instead of olefinic hydrocarbon radical, is used, alone or in combination with other silanes or siloxanes, in sufficient amount to provide the necessary number of silicon-bonded hydrogen atoms in the organohydrogenpolysiloxane. Examples of hydrogen atom-containing silanes or siloxanes include, but are not limited to, $HMe_2SiCl$, $HMeSiCl_2$, $HSiCl_3$, $HMe_2SiOSiMe_2H$ and cyclo-$(MeHSiO)_4$. Component (D) is preferably prepared under non-alkaline conditions to minimize cleavage of Si—H linkages.

In between steps (I) and (II) there is sometimes needed a delay of sufficient duration to achieve the improvement described herein. The period of time varies depending on the concentrations of Components (A) and (B), and the concentration of any optional components in the mixture.

The period of delay is greatly influenced by the strength of the inhibitor. With a strong inhibitor such as a maleate or a butynol, the period of time needed to achieve the unexpected results produced by the process of this invention can be extremely small. For example, the delay time needed between steps (I) and (II) when the inhibitor is a maleate or a butynol can be substantially zero. However, when the inhibitor is weak, such as a fumarate, the delay time needed to produce the improvement in bath life and/or cure time can be substantially longer.

The order of mixing components (A) to (D) is critical to this invention. The components in the process of this invention must be added in the order described below for the unexpectedly favorable results to occur. The order of mixing components (A) through (D) must occur in the following manner: first components (A), and (B) must be mixed together, thereafter, the resulting mixture is added to component (C), and then after components (A), (B), (C) have been combined, component (D) is added to the resulting mixture. A delay of sufficient duration is sometimes needed between steps (I) and (II) to achieve the herein described improvement. This process then forms a liquid curable mixture that has an unexpectedly improved bath life which is then applied to a solid substrate, and exposed to heat and/or actinic radiation in an amount sufficient to cure the curable mixture.

The process of this invention can also contain an optional Component (E). Component (E) is any compound which is effective for extending the bath life of a curable mixture of the above delineated Components (A), (B), (C), and (D) when introduced according to this invention, but which is ineffective for extending the bath life of the same mixture, absent above described Component (A). In other words, Component (E) lacks an inhibiting effect on platinum group metal containing catalysts by itself, yet increases the bath life of the mixture when a platinum group metal-containing catalyst is present. The term "inhibiting effect" means the room temperature cure-retarding effect of an inhibitor, as noted above. In a preferred embodiment of this invention, Component (E) can be any compound which increases the bath life, but not the 70° C. cure time, of a platinum-catalyzed composition which contains a fumarate or maleate inhibitor compound in an amount that is effective for providing less than 8 hours of bath life at 25° C.; yet does not have the same effect in an identical composition which is free of a fumarate or maleate inhibitor compound.

Extensive experimentation indicates that Component (E) can be any organic or inorganic compound which is free of an inhibiting effect and has a Hansen partial solubility parameter for hydrogen-bonding of 8.0 or more, preferably 13–48. C. M. J. Hansen, *Journal of Paint Technology*, Volume 39, p. 104–105, (1967); and A. F. M. Barton, *CRC Handbook of Solubility Parameters and Other Cohesion Parameters*, p. 153–160, CRC Press, Inc. are included herein by reference to disclose Hansen partial solubility parameters for hydrogen-bonding and how to measure them. Preferred bath life extender compounds to be used as Component (E) in the process of this invention have the above-noted Hansen value of greater than 8.0, preferably 13–48, and are free of steric hindrance in the polar portion of the molecule.

General examples of preferred Component (E) include compounds which contain one or more primary or secondary alcohol groups, carboxylic acids (including compounds which yield carboxylic acids when exposed to water at room temperature), cyclic ethers, and water. Included in this group are the primary and secondary alcohols; diols and triols, such as ethylene glycol, propylene glycol and glycerine; partial ethers of diols and triols, such as 2-methoxyethanol, 2-methoxypropanol, and 2-methoxyisopropanol; tetrahydrofuran; water and aqueous solutions of mineral acids, alkalis, and salts. Primary and secondary alcohols, preferably having fewer than 10 carbon atoms are the most preferred for Component (E) of the process of this invention. Examples thereof include methanol, 1-butanol, 2-butanol, tetradecanol and other alkanols, such as ethanol, and normal-, and iso-propanol, iso-butanol, and the normal-, secondary-, and iso-pentanols, -hexanols, -heptanols, and -octanols; benzyl alcohol, phenol, and other aromatic alcohols such as methylphenyl carbinol, and 2-phenylethyl alcohol; allyl alcohol, cyclohexanol, etc. The particular choice of Component (E) from this group of materials can depend on such factors as volatility, toxicity, flammability, and odor for use in the process of this invention. The preferred bath life extender for the process of this invention is benzyl alcohol.

When optional Component (E) is utilized in the present invention it must be added to the mixture separately from Component (A), not as a premix of the two compounds. The preferred order of mixing when Component (E) is added to the mixture is, (I), mixing Components (A) and (B) together, (II), then adding Component (C) to the mixture of (I), (III), next adding Component (E) to the mixture of (II), then (IV), adding Component (D) to the mixture of (III). Although the above order of mixing is preferred, optional Component (E) can also be added after Components (A) and (B) have been mixed and prior to the addition of Component (C).

The amount of Component (E) to be used in the process of this invention is not critical and is merely that amount that will provide a longer bath life for the composition than the bath life of an identical composition that does not contain Component (E).

The amount of Component (E) that is to be used in the process of this invention can be as high as 10 percent or more by weight, based on the weight of Component (A), however superior results with respect to bath life and cure time can be obtained using a lesser amount. Preferably, the amount of Component (E) to be used in the process of this invention falls within the range of 0.1 to 5 percent, and most preferably 1 to 3 percent, by weight, based on the weight of Component (C).

The weight ratio of Component (E) to Component (A) in the process of this invention can have a value from 20/1 to 1/20, but typically has a value of from 10/1 to ⅓, and preferably a value of from 5/1 to ½. The compositions utilized in the process of this invention can contain any optional components commonly used in platinum group metal catalyzed organosilicon compositions, such as reinforcing and extending fillers, hydrocarbons and halohydrocarbons free of aliphatic unsaturation, colorants, stabilizers, adhesion modifiers, adhesive-release modifiers, etc.

The process of this invention can be completed by mixing Components (A), (B), (C), (D) and (E) and any optional components in the order delineated above, using any suitable mixing means, such as a spatula, a drum roller, a mechanical stirrer, a three-roll mill, a sigma blade mixer, a bread dough mixer, and a two-roll mill.

By actinic radiation it is meant ultraviolet light; electron beam radiation; and alpha-, beta-, gamma- and x-rays. By heat it is meant infrared radiation, hot-air, microwave radiation, etc. Of course actinic radiation is frequently accompanied by heat and the use of a combination of the two falls within the scope and spirit of the present process. In the preferred process of this invention, the coating process can be accomplished by any suitable manner known in the art, such as by spreading, brushing, extruding, spraying, gravure, kiss-roll and air-knife.

In a preferred embodiment of the instant process the solid substrate is a flexible sheet material such as paper, polyolefin film and polyolefin-coated paper or foil. Other suitable solid substrates that can be coated by the process of this invention include other cellulosic materials such as wood, cardboard and cotton; metallic materials such as aluminum, copper, steel and silver; siliceous materials such as glass and stone; and synthetic polymer materials such as polyolefins, polyamides, polyesters and polyacrylates. As to form the solid substrate can be substantially sheet-like, such as a peelable release liner for pressure sensitive adhesive; a fabric or a foil; or substantially three-dimensional in form.

After the liquid curable composition has been coated onto a substrate it is heated and/or irradiated with actinic radiation, as noted herein, to cure the liquid coating and to adhere it to the substrate.

In a preferred embodiment of the process of this invention, a flexible sheet material, such as paper, metal foil or tapestock, is coated with a thin coating of the liquid curable composition, preferably in a continuous manner and the thus-coated material is then heated and/or irradiated to rapidly cure the coating, to provide a sheetlike material bearing on at least one surface thereof an adhesive-releasing coating. The adhesive-releasing coating is subsequently brought into contact with a pressure sensitive adhesive, preferably in an in-line manner, to form an article having a peelable, i.e. releasable, adhesive/coating interface. Examples of such an article include, adhesive labels having a peelable backing, adhesive tape in roll form and adhesive packaged in a strippable container. The pressure sensitive adhesive can be non-silicone-based, such as the well-known acrylic or rubber types or silicone-based, such as the peroxide- or platinum-curable polydiorganosiloxane-based adhesives.

The process of this invention is also applicable to adhesive materials, other than pressure sensitive adhesives. Examples of said adhesive materials include foods, asphalt and gum polymers.

The following examples are disclosed to further teach, but not limit, the invention which is properly delineated by the appended claims. All amounts (parts and percentages) are by weight unless otherwise indicated. Viscosities were measured with a rotating spindle viscometer. Bath life of a composition means the time interval required for the freshly prepared composition to gel at room temperature.

Cure time for a composition means the time interval required for the composition, when coated onto S2S kraft paper, at a thickness of 1 pound per ream, to attain the nosmear, no migration, no rub-off condition.

The no smear condition was determined by lightly streaking the coating with a finger and observing for the absence of haze in the streaked area.

The no migration condition was determined by firmly adhering a common, pressure sensitive adhesive tape to the coating, removing the tape and folding the removed tape together, adhesive surfaces to each other. Absence of migration of the coating to the tape was indicated by noting that the doubled tape was as difficult to separate as unused tape so doubled.

The no rub-off condition was determined by vigorously rubbing the coating with the index finger and noting that the coating could not be removed from the paper.

The maleates and fumarates disclosed herein were prepared by the reaction of maleic and fumaric acid, respectively, with the appropriate alcohol. A water azeotroping solvent and concentrated $H_2SO_4$ were also used to conduct the esterification reaction. Following removal of water of esterification by azeotropic distillation the reaction mixtures were washed with 10% aqueous NaHCO and then with water, dried and the reaction products were isolated by vacuum fractional distillation.

A 5-hexenyldimethylsiloxane-endblocked copolymer of dimethylsiloxane units and 5-hexenylmethylsiloxane units having the average formula $HexMe_2SiO(Me_2SiO)_{151}(MeHexSiO)_3SiMe_2Hex$, where Me denotes methyl and Hex denotes $CH_2=CHCH_2CH_2CH_2CH_2-$, was prepared according to U.S. Pat. No. 4,609,574 by mixing cyclopolydimethylsiloxanes, the hydrolyzate of 5-hexenylmethyldichlorosilane, 5-hexenyl-endblocked polydimethylsiloxane fluid and KOH in a flask and heating to 150° C. for 5 hours. After cooling, the mixture was treated with carbon dioxide for 30 minutes to neutralize the KOH. Fuller's Earth (5 g) was added and after 24 hours, the mixture was filtered to yield the copolymer.

U.S. Pat. No. 4,609,574 discloses the details of how to prepare the copolymer delineated immediately above and other 5-hexenyl-substituted silicon compounds such as $HexMeSiCl_2$ and $HexMe_2SiCl$ and other polymers, such as the hydrolyzate of $HexMeSiCl_2$ and hexenyl-endblocked polydimethylsiloxane fluid.

EXAMPLE 1

This example is presented to illustrate the utility of the process of this invention.

A curable coating composition using the process of this invention was prepared by mixing, in the order given, a mixture of 0.70 g of diethyl fumarate and 1.90 g of a platinum catalyst (a soluble platinum complex containing 0.67% platinum formed from chloroplatinic acid and divinyltetramethyldisiloxane), then adding 97.29 g of the 5-hexenyl-endblocked copolymer of 5-hexenylmethylsiloxane units and dimethylsiloxane units, noted above, then adding 0.30 g of benzyl alcohol; and then last adding 3.50 g of an organohydrogenpolysiloxane crosslinker having the average formula $Me_3SiO(Me_2SiO)_{12}(MeHSiO)_{28}SiMe_3$ and having a DP(Degree of Polymerization) of 40.

The viscosity of the coating at 40° C. (104° F.) was found to range from 313 to 393 mPa s (centipoise) over an 7 hour period. The cure time of the freshly prepared composition was found to be 15 seconds, 5 seconds and less than 5 seconds at 82.2° C. (180° F.), 115..5° C. (240° F.) and 148.9° C. (300° F.), respectively.

For comparison, a composition using a process of the prior art was prepared by mixing together, 97.29 g of the 5-hexenyl-endblocked copolymer of 5-hexenylmethylsiloxane units and dimethylsiloxane units, noted above, 0.81 g of bis(2-methoxyisopropyl) maleate, 1.90 g of a platinum catalyst (a soluble platinum complex containing 0.67% platinum formed from chloroplatinic acid and divinyltetramethyldisiloxane); and then adding 3.50 g of an organohydrogenpolysiloxane crosslinker having the average formula $Me_3SiO(Me_2SiO)_{12}(MeHSiO)_{28}SiMe_3$ and a DP of 40.

The viscosity of the comparison coating at 40° C. (104° F.) was found to range from 350 to 698 mPa.s (centipoise) over an 7 hour period. The cure time of the freshly prepared composition was found to be 50 seconds, 15 seconds and less than 5 seconds at 82.2° C. (180° F.), 115.5° C. (240° F.) and 148.9° C. (300° F.), respectively.

The freshly prepared compositions were coated onto 54 pound paper and samples of the coated paper were heated at 180°, 240° or 300° F. for various lengths of time and the thus cured coatings were laminated, in-line, with an acrylic adhesive (GMS-263; Monsanto, St. Louis, Mo.). The adhesive solution was applied to the coatings at a wet thickness of 3 mils using a drawdown bar. The applied adhesive was air-dried at room temperature for one minute, heated at 70° C. for one minute and the cooled to room temperature for one minute. A sheet of 60 pound matte litho was applied to the dried adhesive and the resulting laminates were pressed with a 4.5 pound rubber-coated roller. The test laminates were then aged at room temperature for 1 day and cut into 1-inch strips. Adhesive release testing was done by pulling the substrate/coating from the matte/adhesive of the 1-inch strips at an angle of 180 degrees and at a rate of 10 meters per minute. The force needed to separate the adhesive/coating interface was noted several times during the separation and adhesive release was noted as an average of the several readings.

The release values, listed in Table I, show that the process of this invention produces compositions that are more efficient in an in-line process of adhesive lamination than a process of the prior art. In other words, a process of the prior art, noted for producing compositions as release coatings for receiving an acrylic adhesive, in-line, requires a heating time of 130 seconds at 180° F. to provide a laminate having a release which is similar to the composition produced in the process of this invention which was heated for only 50 seconds. This advantage is found at higher temperatures as well, albeit to a lesser degree.

TABLE I

| Cure Conditions | Adhesive Release. g/in. | |
| --- | --- | --- |
| Seconds/F. | Comparison (i) | Example 43 |
| 50/180 | Tear | 133 |
| 90/180 | 210 | 90 |
| 130/180 | 145 | 65 |
| 20/240 | 95 | 80 |
| 40/240 | 58 | 50 |
| 80/240 | 50 | 40 |
| 10/300 | 65 | 60 |
| 20/300 | 56 | 53 |
| 40/300 | 40 | 30 |

This data illustrates that mixing a catalyst, fumarate inhibitor, and alcohol according to the process of this invention is more efficient than mixing a maleate inhibitor, which previously had given much better results than the fumarate inhibitors, and a catalyst according to a mixing order of the art.

EXAMPLE 2

This example illustrates the advantages obtained by utilizing the process of this invention. It also exemplifies the criticality of the order of mixing to the process of the present invention.

A curable coating composition produced by the process of this invention was prepared by mixing, in the order given, a mixture of 0.73 g of bis(2-methoxyisopropyl) maleate and 1.71 g of a platinum catalyst (a soluble platinum complex containing 0.67% platinum formed from chloroplatinic acid and divinyltetramethyldisiloxane), then adding the resulting mixture to 87.56 g of the 5-hexenyl-endblocked copolymer of 5-hexenylmethylsiloxane units and dimethylsiloxane units, noted above, and last adding 3.15 g of an organohydrogenpolysiloxane crosslinker having the average formula Me$_3$SiO(Me$_2$SiO)$_{12}$(MeHSiO)$_{28}$SiMe$_3$ and a DP of 40.

The viscosity of the coating at 40° C. (104° F.) was found to range from 320 to 355 mPa s (centipoise) over an 7 hour period. This results in a calculated bath life of about 20.3 hours. The cure time of the freshly prepared composition was found to be 55 seconds initially and 60 seconds after 6 hours at 82.2° C. (180° F.).

For comparison, a composition using a process of the prior art was prepared by mixing together, 87.56 g of the 5-hexenyl-endblocked copolymer of 5-hexenylmethylsiloxane units and dimethylsiloxane units, noted above, 0.73 g of bis(2-methoxyisopropyl) maleate, 1.71 g of a platinum catalyst (a soluble platinum complex containing 0.67% platinum formed from chloroplatinic acid and divinyltetramethyldisiloxane); and then adding 3.15 g of an organohydrogenpolysiloxane crosslinker having the average formula Me$_3$SiO(Me$_2$SiO)$_{12}$(MeHSiO)$_{28}$SiMe$_3$ and a DP of 40.

The viscosity of the comparison coating at 40° C. (104° F.) was found to range from 355 to 438 mPa s (centipoise) over an 7 hour period. This results in a calculated bath life of about 10.0 hours, about half as long as the bath life of the coating produced by the process of the present invention. The cure time of the freshly prepared composition was found to be 50 seconds initially and 55 seconds after 6 hours at 82.2° C. (180° F.).

The data illustrates the following. That premixing the inhibitor and the platinum catalyst prior to adding the polymer and the crosslinker to the mixture results in an increase in the calculated bath life of the coating as shown by the calculated bath life of the coating produced by the process of this invention being about twice as long as the calculated bath life of the coating produced by a process known in the art.

EXAMPLE 3

A curable coating composition using the process of this invention was prepared by mixing, in the order given, a mixture of 0.98 g of diethyl fumarate and 1.85 g of a platinum catalyst (a soluble platinum complex containing 0.67% platinum formed from chloroplatinic acid and divinyltetramethyldisiloxane), then adding the resulting mixture to 100.00 g of the 5-hexenyl-endblocked copolymer of 5-hexenylmethylsiloxane units and dimethylsiloxane units, noted above, next adding 0.42 g of benzyl alcohol; and last adding 4.00 g of an organohydrogenpolysiloxane crosslinker having the average formula Me$_3$SiO(Me$_2$SiO)$_{12}$(MeHSiO)$_{28}$SiMe$_3$ and having a DP(Degree of Polymerization) of 40.

A coating produced from a comparison process was prepared by mixing, in the order given, 1.40 g of a blend of 70% diethyl fumarate and 30% benzyl alcohol and 1.85 g of a platinum catalyst (a soluble platinum complex containing 0.67% platinum formed from chloroplatinic acid and divinyltetramethyldisiloxane), added to 100 g of the 5-hexenyl-endblocked copolymer of 5-hexenylmethylsiloxane units and dimethylsiloxane units, noted above, and then adding to the resulting mixture 4.00 g of an organohydrogenpolysiloxane crosslinker having the average formula Me$_3$SiO(Me$_2$SiO)$_{12}$(MeHSiO)$_{28}$SiMe$_3$ and having a DP(Degree of Polymerization) of 40.

The bath life at 40° C. of both coatings were determined. In addition, the cure time at 82.2° C. (180° F.) of the compositions was measured and the compositions were coated on super calendered Kraft paper and also on clay coated paper and exposed to UV light on a conveyer unit having a maximum speed of 143 ft/min and 2 medium pressured mercury UV lamps at 200 watts/inch.

The viscosity of the coating prepared by the process of the present invention was found to range from 388 to 1020 mPa s (centipoise) over a 5.5 hour period, and the viscosity of the comparison coating ranged from 413 to 1055 in a 3.5 hour period. The cure time of the coating produced by the process of the present invention at 82.2° C. (180° F.) was found to be 10 seconds on the super calendered Kraft paper and 20 seconds on clay coated paper. In contrast, the coating produced by the comparison process gave a cure time at 82.2° C. (180° F.) of 35 seconds on the super calendered Kraft paper and 60 seconds on clay coated paper. The UV-cure time of the coating produced by the process of the present invention was found to be 143 feet/minute on both the super calendered Kraft paper and on clay coated paper, while the comparison process yielded a coating with a UV-cure time of 64 feet/minute on both the super calendered Kraft paper and clay coated paper.

The data illustrates that by premixing the catalyst and inhibitor prior to adding the polymer, the optional alcohol component, and the crosslinker, results in a much improved bath life and cure time for the compositions produced by such an order of mixing. This example also illustrates that adding the optional alcohol component after the catalyst and inhibitor are mixed produces a much improved cure time. The cure times produced by the process of the present invention were one-third shorter than the cure times produced by a process utilized in the art.

EXAMPLE 4

This example illustrates the advantages obtained by utilizing the process of this invention. It also exemplifies the criticality of the order of mixing to the process of the present invention.

A curable coating composition produced by the process of this invention was prepared by mixing, in the order given, a mixture of 0.73 g of bis(2-methoxyisopropyl) maleate and 1.71 g of a platinum catalyst (a soluble platinum complex containing 0.67% platinum formed from chloroplatinic acid and divinyltetramethyldisiloxane), then adding the resulting mixture to 87.56 g of the 5-hexenyl-endblocked copolymer of 5-hexenylmethylsiloxane units and dimethylsiloxane units, noted above, and last adding 3.15 g of an organohydrogenpolysiloxane crosslinker having the average formula $Me_3SiO(Me_2SiO)_{12}(MeHSiO)_{28}SiMe_3$ and a DP of 40.

The viscosity of the coating at 40° C. (104° F.) was found to range from 383 to 590 mPa s (centipoise) over an 10.5 hour period. The cure time of the freshly prepared composition was found to be 45 seconds after 1 hour, and 45 seconds after 7 hours at 82.2° C. (180° F.).

For comparison, a composition using a process of the prior art was prepared by mixing together, in the order given, 87.56 g of the 5-hexenyl-endblocked copolymer of 5-hexenylmethylsiloxane units and dimethylsiloxane units, noted above, 0.73 g of bis(2-methoxyisopropyl) maleate, 1.71 g of a platinum catalyst (a soluble platinum complex containing 0.67% platinum formed from chloroplatinic acid and divinyltetramethyldisiloxane); and then adding 3.15 g of an organohydrogenpolysiloxane crosslinker having the average formula $Me_3SiO(Me_2SiO)_{12}(MeHSiO)_{28}SiMe_3$ and a DP of 40.

The viscosity of the comparison coating at 40° C. (104° F.) was found to range from 405 to 845 mPa s (centipoise) over an 10.5 hour period. The cure time of the freshly prepared composition was found to be 40 seconds after 1 hour, and 55 seconds after 7 hours at 82.2° C. (180° F.).

The data illustrates the following. That premixing the inhibitor and the platinum catalyst prior to adding the polymer and the crosslinker to the mixture provides a much longer bath life to the composition in contrast to the bath life resulting from a process utilized in the art.

That which is claimed is:

1. A process, the process comprising the steps of:
   (I) first mixing
      (A) an inhibitor compound; and
      (B) a platinum group metal-containing catalyst;
   (II) thereafter adding the mixture of (I) to
      (C) an organosilicon compound having an average of at least two curing radicals per molecule thereof selected from the group consisting of the hydroxy radical and olefinic hydrocarbon radicals;
   (III) thereafter adding to the mixture of (II)
      (D) an organohydrogensilicon compound containing an average of at least two silicon-bonded hydrogen atoms per molecule thereof, the amounts of components (C) and (D) being sufficient to provide a ratio of the number of silicon-bonded hydrogen atoms to the number of silicon-bonded curing radicals of from 1/100 to 100/1;
   (IV) applying the mixture from (III) to a solid substrate to form a coating;
   (V) exposing the coating to an energy source selected from the group consisting of
      (i) heat, and
      (ii) actinic radiation in an amount sufficient to cure the coating; whereby the amount of component (A) present in the total composition of components (A), (B), (C), and (D), is sufficient to retard any curing reaction at room temperature but insufficient to prevent any reaction at elevated temperatures; and whereby the amount of component (B) is sufficient to accelerate any curing reaction among the silicon-bonded curing radicals and the silicon-bonded hydrogen atoms at elevated temperatures.

2. The process according to claim 1 wherein the process additionally comprises adding a bath life extender compound in a total amount sufficient to retard any curing reaction at room temperature after step (I).

3. The process according to claim 2 wherein the bath life extender compound is added after step (II).

4. The process according to claim 1 wherein component (A) has the formula $R^1(OQ)_tO_2CCH=CHCO_2(QO)_tR^1$, wherein $R^1$ denotes, independently, a monovalent hydrocarbon radical having from 1 to 10 carbon atoms, each Q denotes, independently, an alkylene radical having from 2 to 4 carbon atoms, and t has a value of 0 or 1.

5. The process according to claim 4 wherein component (A) is a maleate having the formula $R^1(OQ)_tO_2CCH=CHCO_2(QO)_tR^1$.

6. The process according to claim 2 wherein component (A) has the formula $R^1(OQ)_tO_2CCH=CHCO_2(QO)_tR^1$, wherein $R^1$ denotes, independently, a monovalent hydrocarbon radical having from 1 to 10 carbon atoms, each Q denotes, independently, an alkylene radical having from 2 to 4 carbon atoms, and t has a value of 0 or 1.

7. The process according to claim 6 wherein component (A) is a fumarate having the formula $R^1(OQ)_tO_2CCH=CHCO_2(QO)_tR^1$.

8. The process according to claim 1 wherein the platinum-containing compound is a vinyl-siloxane complex of chloroplatinic acid.

9. The process according to claim 2 wherein the bath life extender compound is selected from the group consisting of compounds containing at least one primary or secondary alcohol radical, carboxylic acids, compounds which yield carboxylic acids when exposed to water at room temperature, cyclic ethers, and water.

10. The process according to claim 9 wherein the bath life extender compound is selected from a group consisting essentially of a
   (i) primary alcohol, and
   (ii) secondary alcohol.

11. The process according to claim 1 wherein component (C) is an organopolysiloxane having the average unit formula $R^2_cSiO_{(4-c)/2}$ wherein $R^2$ denotes a monovalent radical containing up to 20 carbon atoms and being selected from the group consisting of halohydrocarbon radicals free of aliphatic unsaturation, hydrocarbon radicals and hydroxy radicals and c has a value of from 1 to 3; and component (D) is an organohydrogenpolysiloxane having the average unit formula $R_e{}^3H_fSiO_{(4-e-f)/2}$ wherein $R^3$ denotes a monovalent radical containing from 1 to 20 carbon atoms and being selected from the group consisting of hydrocarbon and halohydrocarbon radicals, all of which are free of aliphatic unsaturation, f has a value of from greater than 0 to 1 and the sum of e plus f has a value of from 1 to 3; the amounts of components (C) and (D) being sufficient to provide a ratio of the number of silicon-bonded hydrogen atoms to the number of silicon-bonded curing radicals of from ½ to 20/1.

12. The process according to claim 11 wherein component (C) has the formula $XR_2SiO(RXSiO)_xSiR_2X$ wherein R denotes a monovalent hydrocarbon or halohydrocarbon radical free of aliphatic unsaturation and having 1–20 carbon atoms, X denotes a radical selected from the group consisting of olefinic hydrocarbon radicals having from 2 to 20 carbon atoms and R radicals, an average of at least two X radicals per molecule of component (C) being olefinic hydrocarbon radicals, x has an average value sufficient to provide a viscosity at 25° C. of at least 25 millipascal-seconds for component (C); and component (D) has the formula $YR_2SiO(RYSiO)_ySiR_2Y$ wherein R denotes a monovalent hydrocarbon or halohydrocarbon radical free of aliphatic unsaturation and having 1–20 carbon atoms, Y denotes a hydrogen atom or an R radical, an average of at least two Y radicals per molecule of component (D) being hydrogen atoms, y has an average value sufficient to provide a viscosity at 25° C. of from 1 to 100 millipascal-seconds for component (D), the ratio of the amounts of (C) to (D) being sufficient to provide from 0.5 to 2 silicon-bonded hydrogen atoms for every silicon-bonded olefinic hydrocarbon radical; component (B) is a platinum-containing compound; component (A) is an ester having the formula $R^1(OQ)_tO_2CCH=CHCO_2(QO)_tR^1$, wherein each $R^1$ denotes, independently, a monovalent hydrocarbon radical having from 1 to 10 carbon atoms, each Q denotes, independently, an alkylene radical having from 2 to 4 carbon atoms, and t has a value of 0 or 1.

13. The process according to claim 12 wherein component (C) has the formula $XMe_2SiO(ME_2SiO)_b(MeXSiO)_dSiMe_2X$ wherein Me denotes methyl, X denotes a radical selected from the group consisting of olefinic hydrocarbon radicals having from 2 to 20 carbon atoms and methyl radicals, an average of at least two X radicals per molecule of component (C) being olefinic hydrocarbon radicals, b and d having average values of zero or more, and the sum of b plus d has a value sufficient to provide a viscosity at 25° C. of at least 25 millipascal-seconds for component (C); and component (D) has the formula $YMe_2SiO(Me_2SiO)_p(MeYSiO)_qSiMe_2Y$ wherein Y denotes a hydrogen atom or a methyl radical, an average of at least two Y radicals per molecule of component (D) being hydrogen atoms, p and q having average values of zero or more, the sum of p plus q has a value sufficient to provide a viscosity at 25° C. of from 1 to 100 millipascal-seconds for component (D), the ratio of the amounts of (C) to (D) being sufficient to provide from 0.5 to 2 silicon-bonded hydrogen atoms for every silicon-bonded olefinic hydrocarbon radical; component (B) is a vinyl-siloxane complex of chloroplatinic acid; and component (A) is a maleate having the formula $R^1(OQ)_tO_2CCH=CHCO_2(QO)_tR^1$.

14. The process according to claim 13 wherein component (C) has the formula $HexMe_2SiO(Me_2SiO)_b(MeHexSiO)_dSiMe_2Hex$, wherein
Hex denotes $CH_2=CHCH_2CH_2CH_2CH_2—$;
component (D) has the formula $Me_3SiO(Me_2SiO)_p(MeHSiO)_qSiMe_3$;

and
component (A) is bis(2-methoxyisopropyl) maleate.

15. The process according to claim 13 wherein component (C) has the formula $ViMe_2SiO(Me_2SiO)_b(MeViSiO)_dSiMe_2Vi$, wherein
Vi denotes $CH_2=CH—$;
component (D) has the formula $Me_3SiO(Me_2SiO)_p(MeSiO)_qSiMe_3$;

and
component (A) is bis(2-methoxyisopropyl) maleate.

16. A process according to claim 2 wherein component (A) has the formula $XMe_2SiO(Me_2SiO)_b(MeXSiO)_dSiMe_2X$ wherein Me denotes methyl, X denotes a radical selected from the group consisting of olefinic hydrocarbon radicals and methyl radicals having from 2 to 20 carbon atoms, an average of at least two X radicals per molecule of component (C) being olefinic hydrocarbon radicals, b and d having average values of zero or more, and the sum of b plus d has a value sufficient to provide a viscosity at 25° C. of at least 25 millipascal-seconds for the component (C); and component (D) has the formula $YMe_2SiO(Me_2SiO)_p(MeYSiO)_qSiMe_2Y$ wherein Y denotes a hydrogen atom or a methyl radical, an average of at least two Y radicals per molecule of component (D) being hydrogen atoms, p and q have average values of zero or more, the sum of p plus q has a value sufficient to provide a viscosity at 25° C. of from 1 to 100 millipascal-seconds for the component (D), the ratio of the amounts of (C) to (D) being sufficient to provide from 0.5 to 2 silicon-bonded hydrogen atoms for every silicon-bonded olefinic hydrocarbon radical; component (B) is a vinyl-siloxane complex of chloroplatinic acid; component (A) is a fumarate having the formula $R^1(OQ)_2O_2CCH=CHCO_2(QO)_2R^1$; and the bath life extender compound is a primary or secondary alcohol.

17. A process according to claim 16 wherein the substrate is a flexible sheet material.

18. A process according to claim 17 wherein the flexible sheet material is paper.

19. A process according to claim 17 further comprising (III) releasably adhering a pressure sensitive adhesive composition to the cured applied coating.

20. A process according to claim 16 wherein component (C) has the formula $HexMe_2SiO(Me_2SiO)_b(MeHexSiO)_dSiMe_2Hex$, wherein Hex denotes $CH_2=CHCH_2CH_2CH_2CH_2—$; component (D) has the formula $Me_3SiO(Me_2SiO)_p(MeHSiO)_qSiMe_3$; component (A) is diethyl fumarate; and the bath life extender compound is benzyl alcohol.

21. A process according to claim 16 wherein component (C) has the formula $ViMe_2SiO(Me_2SiO)_b(MeViSiO)_dSiMe_2Vi$, wherein Vi denotes $CH_2=CH—$; component (D) has the formula $Me_3SiO(Me_2SiO)_p(MeHSiO)_qSiMe_3$; component (A) is diethyl fumarate; and the bath life extender compound is benzyl alcohol.

* * * * *